United States Patent [19]

Wright et al.

[11] Patent Number: 5,306,560
[45] Date of Patent: Apr. 26, 1994

[54] CERAMIC COATED FIBERS

[75] Inventors: Robert J. Wright, Tequesta; William J. Dalzell, Jr., Jupiter, both of Fla.

[73] Assignee: United Technologies Corporation, Hartford, Conn.

[21] Appl. No.: 637,849

[22] Filed: Jan. 7, 1991

[51] Int. Cl.$^5$ .............................................. B05D 3/02
[52] U.S. Cl. .................................. 428/379; 209/181.4
[58] Field of Search ...................... 438/379; 204/181.4

[56] References Cited

U.S. PATENT DOCUMENTS

| | | | |
|---|---|---|---|
| 3,445,361 | 5/1969 | Sicka et al. | 204/181.4 |
| 3,663,182 | 5/1972 | Hamling | 428/224 |
| 3,947,340 | 3/1976 | Kawagoshi et al. | 204/181 |
| 3,992,498 | 11/1976 | Morton et al. | 264/63 |
| 4,360,449 | 11/1982 | Oberlander et al. | 252/313 R |
| 4,532,072 | 7/1985 | Segal | 252/313.1 |
| 4,732,779 | 3/1988 | Towata et al. | 428/379 X |
| 4,801,399 | 1/1989 | Clark et al. | 252/315.01 |
| 4,920,083 | 4/1990 | Menon | 501/84 |
| 4,921,731 | 5/1990 | Clark et al. | 427/314 |
| 4,961,990 | 10/1990 | Yamada et al. | 428/408 X |
| 5,011,508 | 4/1991 | Wald et al. | 51/293 |

OTHER PUBLICATIONS

Yoldas, "Alumina Sol Preparation from Alkoxides", American Ceramic Society Bulletin, vol. 54 No. 3 (1975), pp. 289–290.

Primary Examiner—Peter A. Nelson
Attorney, Agent, or Firm—Herbert W. Mylius

[57] ABSTRACT

Ceramic coated fibers may be produced by the electrophoretic deposition of metal oxide coatings on a conductive fiber core.

20 Claims, 1 Drawing Sheet

CERAMIC COATED FIBERS

The invention was made under a U.S. Government contract and the Government has rights herein.

TECHNICAL FIELD

The present invention relates to the general area of coatings of ceramic materials on a substrate, and particularly oxide or mixed oxide coatings on a filament, wire, or tow by electrophoretic deposition of a colloidal material from a sol. More particularly, it relates to ceramic coated fibers, such as even, dense, and uniform coatings of the oxides of aluminum, yttrium, and mixtures thereof, such as Yttria-Alumina-Garnet, or YAG, on fiber cores such as wire.

BACKGROUND ART

It is well known to apply coatings to the surface of a body so as to obtain surface properties which differ from those of the body. This may be done to achieve a variety of improvements, such as increased toughness, high temperature capability, wear resistance, and corrosion resistance. By providing surface coatings of the appropriate characteristics, it is possible to substantially lower the cost of an article built to specific property requirements. For example, ceramics have frequently been utilized to provide a surface coating over a less temperature resistant metallic article to permit use of that article in higher temperature environments. In addition, ceramic materials are frequently utilized to provide enhanced strength in metal matrix composites by inclusion in the form of powders, fibers, and whiskers. There is also a need for ceramic coated fibers for use in metal matrix composites, particularly those fibers coated with oxides, mixed oxides, or doped oxides, which coatings serve as diffusion or chemical barriers.

In the past, various processes have been used to deposit ceramic materials upon a substrate. These include the application of glazes, enamels, and coatings; hot-pressing materials at elevated pressure and temperature; and vapor deposition processes such as evaporation, cathodic sputtering, chemical vapor deposition, flame spraying, and plasma spraying. In addition, electrophoresis has been attempted, as have other specialized techniques, with limited success in application.

For example, the enamelling industry has used the electrodeposition of ceramic materials for some time. In the application of a ceramic coating by this technique, a ceramic material is milled or ground to a small particulate or powder size, placed into suspension, and electrophoretically deposited on the substrate. Another traditional method is the deposition of a ceramic coating from a slurry made up of a powder in suspension, usually in an aqueous medium. A major problem with these techniques is that powder particle sizes below about 2 microns were difficult to obtain, thus limiting the quality of coatings produced, as well as the possibility of application to a wire or fibrous substrate.

Sol-gel technology has recently evolved as a source of very fine sub-micron ceramic particles of great uniformity. Such sol-gel technology comprises essentially the preparation of ceramics by low temperature hydrolysis and peptization of metal oxide precursors in solution, rather than by the sintering of compressed powders at high temperatures.

In the prior art, much attention has been given to the preparation of sols of metal oxides (actually metal hydroxide or metal hydrate) by hydrolysis and peptization of the corresponding metal alkoxide, such as aluminum sec-butoxide [$Al(OC_4H_9)_3$], in water, with an acid peptizer such as hydrochloric acid, acetic acid, nitric acid, and the like. The hydrolysis of aluminum alkoxides is discussed in an article entitled "Alumina Sol Preparation from Alkoxides" by Yoldas, in American Ceramic Society Bulletin Vol. 54, No. 3 (1975), pages 289-290. This article teaches the hydrolysis of aluminum alkoxide precursor with a mole ratio of water:precursor of 100:1, followed by peptization at 90° with 0.07 moles of acid per mole of precursor. After gelling and drying, the dried gel is calcined to form alumina powder.

In U.S. Pat. No. 4,532,072, of Segal, an alumina sol is prepared by mixing cold water and aluminum alkoxide in stoichiometric ratio, allowing them to react to form a peptizable aluminum hydrate, and peptizing the hydrate with a peptizing agent in an aqueous medium to produce a sol of an aluminum compound.

In Clark et al, U.S. Pat. No. 4,801,399, a method for obtaining a metal oxide sol is taught whereby a metal alkoxide is hydrolysed in the presence of an excess of aqueous medium, and peptized in the presence of a metal salt, such as a nitrate, so as to obtain a particle size in the sol between 0.0001 micron and 10 microns.

In Clark et al, U.S. Pat. No. 4,921,731, a method is taught for ceramic coating a substrate, such as a wire, by thermophoresis of sols of the type prepared by the method of U.S. Pat. No. 4,801,399. In addition, Clark et al, in abandoned U.S. patent application 06/841,089 filed Feb. 25, 1986, teach formation of ceramic coatings on a substrate, including filaments, ribbons, and wires, by electrophoresis of such sols. However, the examples of this application indicate that the coatings obtained using electrophoresis were uneven, cracked, and contained voids or bubbles, and often peeled, flaked off, and/or pulled apart. Throughout, the evolution of hydrogen bubbles at the cathode during electrophoresis was noted.

It is thus seen that a need exists for ceramic coated fibers having uniform surface layers of metal oxide. There is a particular need for ceramic coated fibers for use as reinforcing elements in metal matrix composites.

SUMMARY OF THE INVENTION

In the pursuit of a method for the preparation of defect-free ceramic coated fibers, applicants have developed a novel coated fiber, produced by electrophoretic deposition. This ceramic coated fiber is especially suitable for use as a reinforcing element in metal matrix composites.

As used herein, the term "filament" shall refer to a single strand of fibrous material, "fiber tow" shall refer to a multi-filament yarn or array of filaments, a "wire" shall refer in general to metallic filaments or tows, a "fiber core" shall indicate a filament, fiber tow, or wire suitable for coating by the process of this invention, and the term "ceramic coated fiber" or "coated fiber" shall refer to a fiber core of an electrically conductive material, or a material which has been made to be conductive such as by a flash coat of carbon or a metallizing layer, upon which has been deposited a uniform ceramic layer, such that the diameter of the fiber core is greater than the thickness of the applied ceramic. Conversely, for convenience, the term "ceramic fiber" or "fiber" shall refer to an electrically conductive fiber core material upon which has been deposited a uniform ceramic layer, such that the thickness of the ceramic layer exceeds the diameter of the fiber core. This distinction of relative thickness of surface layer and core is normally recognized in industry to define between coated fiber and fiber. In either case, of course, the fiber core material may be removed by such techniques as acid dissolution, combustion, etc., to leave a hollow ceramic cylinder, which may, of course, then be referred to as a ceramic fiber.

It is an object of this invention to provide a largely void-free ceramic coated fiber. It is a still further object of this invention to provide a highly uniform, essentially defect-free ceramic coating on a fiber core.

The present invention provides a metal oxide coated fiber, produced by:

a) providing a sol comprising metal hydrate particles selected from the group consisting of aluminum hydrate, yttrium hydrate, and mixtures thereof, said particles being less than 150 Angstroms in size, said sol also comprising an alcohol such that the molar ratio of said alcohol to said metal hydrate is from about 50 to about 70;

b) electrophoretically depositing particles from said sol onto on electrically conductive fiber core by applying a direct current potential between said fiber core and an anode, said potential being from about 0.1 to about 100 volts, for sufficient time to obtain a uniform deposit of the desired thickness of metal hydrate on said fiber core, while providing means for removal of hydrogen gas generated by said electrophoresis;

c) removing the metal hydrate coated fiber core from said sol;

d) heating the metal hydrate coated fiber core to dry the coating and to transform said metal hydrate to the corresponding metal oxide; and e) recovering the metal oxide coated fiber.

The present invention further provides a largely void-free metal oxide coated fiber produced by:

a) continuously passing an electrically conductive fiber core through an electrophoresis cell containing a sol prepared by the steps of (1) concurrent hydrolysis and alcoholization of an organometallic compound in an aqueous medium comprising water and an alcohol;

(2) peptization of this reaction mixture with a monovalent acid or acid source;

(3) dehydration and de-alcoholization of the reaction mixture by removal of the excess aqueous phase;

(4) dewatering and further removal of unreacted alcohol by evaporation; and (5) re-alcoholization by addition of a second alcohol to the concentrated sol to form a sol wherein the molar ratio of alcohol to metal hydrate is from about 50 to about 70, and the particle size of said metal hydrate is from about 10 to about 150 Angstroms;

b) applying a potential between said fiber core and another electrode immersed in said sol, whereby metal hydrate particles are continuously deposited on said fiber core;

c) decreasing the evolution of hydrogen by operating said electrophoresis cell at a potential of from about 1 to about 50 volts;

d) providing means for the dispersal and removal of hydrogen gas from the electrophoresis cell;

e) heating the fiber core and metal hydrate particles deposited thereupon after said fiber core emerges from said sol, so as to form a metal oxide coating on said fiber core.

DETAILED DESCRIPTION OF THE INVENTION

Figure 1:
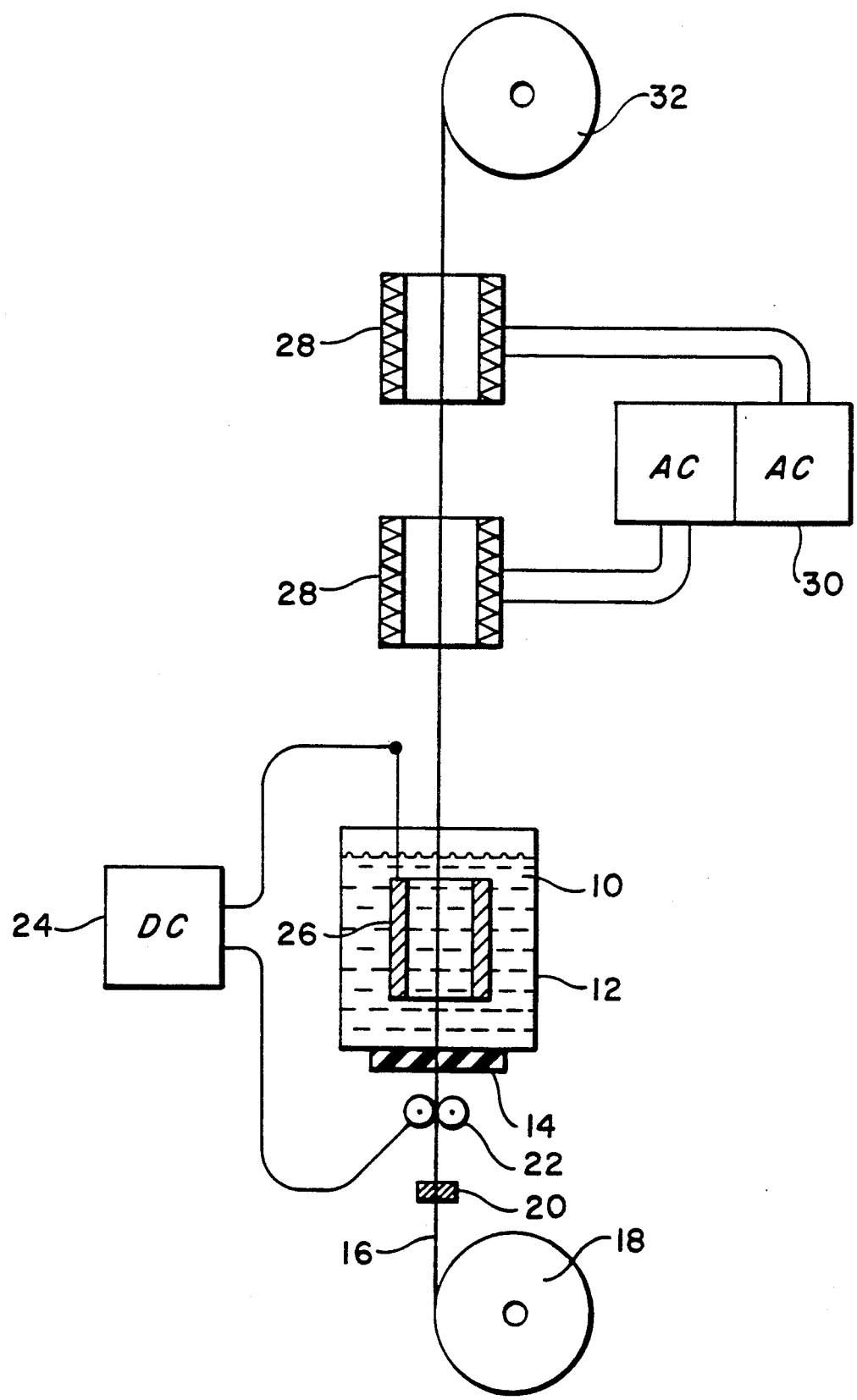
FIG. 1 represents a schematic of apparatus suitable for the preparation of ceramic coated fibers.

The present invention relates to ceramic coated fibers. In addition, the sol disclosed herein may be used to produce multi-layer coatings of ceramic on fiber, or to obtain composite coatings by the incorporation of filler materials therein prior to electrophoresis.

The sols utilized in the preparation of the coated fibers of the present invention may be produced from a variety of organometallic compounds, to yield metal oxides such as alumina, chrome-ion doped alumina, yttria, and mixtures thereof, such as Yttria-Alumina-Garnet, $3Y_2O_3.5Al_2O_3$. While the present disclosure is specifically directed to alumina, chrome-ion doped alumina, and yttria coatings, the invention is not to be limited thereto.

Electrophoresis is an electrodeposition technique whereby minute particles of a normally nonconductive material in colloidal suspension are subjected to an external electric field and thereby caused to migrate toward a specific electrode. Colloids in solution are known to develop a surface charge relative to the suspension medium, as a result of any of a number of possible mechanisms, such as lattice imperfection, ionization, ion absorption, and ion dissolution. In the case of metal oxides such as alumina, the surface charge is the result of ionization, and is generally positive in the preferred pH range, below about 7.

During electrophoresis, the positively charged colloids migrate toward the cathode, forming a compact layer of particles thereupon. The physical properties of the deposited coatings are related to their compaction on, and adherence to, the substrate. Generally, the greater the compaction of the colloidal particles deposited upon the substrate, the better the mechanical properties of the coating and the greater the protection afforded thereby.

Electrophoresis may be utilized to deposit coatings on a wide range of substrates, both metallic and nonmetallic. Exemplary fiber core materials include carbon, glass, silicon carbide, silicon nitride, and metals such as aluminum, iron, nickel, tantalum, titanium, molybdenum, tungsten, rhenium, niobium, and alloys thereof. In general, any material known to be electrically conductive, or which may be made electrically conductive, is capable of being utilized. The diameter of the fiber core is not critical, and may be chosen in accordance with the end usage of the coated fiber to be produced. Core diameters of from about 0.1 mil to about 5 mil or larger are suitable.

In preparation of the subject ceramic coated fibers, organometallic compounds are hydrolyzed and peptized to obtain a sol having a colloidal particle size of from about 10 Angstroms to about 150 Angstroms. A preferred range of particle size is from about 50 Angstroms to about 100 Angstroms. Within these ranges of particle sizes, good contact of the coating materials is attained with the fiber core, giving excellent adhesion, and excellent packing of the coating particles within the coating layer is obtained, resulting in superior coating properties such as wear resistance, and thermal high temperature capability.

Sols suitable for use in preparing the present invention may be obtained by the hydrolysis and peptization of the corresponding organometallic compounds in an aqueous medium. Preferred organometallic compounds are metal alkoxides, and particularly the metal sec-butoxides, ethoxides, and methoxides of aluminum, yttrium, and mixtures thereof. Suitable techniques for the preparation of a sol for the electrophoretic deposition technique of the present invention are set forth in co-pending U.S. patent application 07/ filed concurrently herewith and incorporated herein by reference. Other sols may also, however, be used.

The preparation of the present invention utilizes a method for the electrophoresis of sols preferably designed for that express purpose. To achieve success, it is desirable to utilize a colloid sol having very small particle size, e.g. less than about 150 Angstroms in diameter We have found that this may be achieved by the use of a sol which differs from those of the prior art in that in its preparation, hydrolysis of the metallic precursor occurs in the presence of a molar excess of organic solvent, a dehydration/de-alcoholization step occurs after peptization, and after concentration of the sol by removal of water by such means as evaporation, an alcohol transfer reintroduces alcohol in a molar ratio of up to 70 moles of alcohol per mole of metal hydrate present. While the phase transformation reactions occurring during the specific order of the steps of this process are not fully understood, it is theorized that cross-linkage of the AlOOH species during the dewatering and de-alcoholization steps results in a final coating after electrophoretic deposition which is less prone to cracking, spallation, peeling, or flaking. The re-addition of alcohol after concentration of the sol, i.e. re-alcoholization, results in the production of extremely small colloid particles, and an extremely stable sol having a long shelf life and favorable characteristics for electrophoresis. It is to be noted that individual sols may be tailored by choice of organic solvent, peptizer, and additive alcohol utilized.

In general, the process for preparation of the preferred sols for electrophoresis is comprised of the following steps:

a) concurrent hydrolysis and alcoholization of an organometallic compound in an aqueous medium comprising water and an organic solvent;

b) peptization of this reaction mixture with a monovalent acid or acid source;

c) dehydration and de-alcoholization of the reaction mixture by removal of the excess aqueous phase, e.g. by decanting or pipetting;

d) dewatering and further removal of unreacted alcohol by evaporation, also referred to as concentration and/or volume reduction, generally by a vigorous boiling; and e) re-alcoholization or introduction of additional alcohol to the concentrated sol to form a sol suitable for electrophoresis.

The above procedure is subject to very close control of the proportions of materials utilized, and their molar ratios at the various stages of the procedure. Table I sets forth broad, preferred, and most preferred ranges of the molar ratios of materials during the steps of this procedure, as well as the extent of dewatering/de-alcoholization and volume reduction of the sol.

TABLE I

Parameters for Preparation of Preferred Sol

| Parameter | Broad | Preferred | Most Preferred |
| --- | --- | --- | --- |
| Molar ratio, organometallic compound to water | 0.005–0.03 | 0.006–0.02 | 0.008–0.15 |
| Molar ratio, organic solvent to organometallic compound | 1.0–5.0 | 1.8–3.2 | 2.3–2.7 |
| Molar ratio, peptizer to organometallic compound | 0.05–0.3 | 0.08–0.23 | 0.125–0.175 |
| Percentage of excess aqueous phase removed during dehydration/de-alcoholization | 90–100 | 95–100 | 98–100 |
| Percentage of volume reduction during dewatering (concentration) | 50–75 | 58–72 | 60–70 |
| Molar ratio, added alcohol to metal hydrate in concentrated sol | 50–70 | 55–69 | 58–67 |

It is to be noted that the present invention is premised upon a number of principals which have not been appreciated in the prior art. First, it has been known in the prior art that the evolution of hydrogen during electrophoretic deposition is a source of many problems and defects in the coatings obtained. In fact, the application of voltages above about 3 volts DC may result in hydrogen evolution. The present invention results from a number of techniques used to overcome these problems by preventing, to the extent possible, the evolution of hydrogen gas, and by then providing means for the dispersal and removal of that hydrogen which does evolve. These goals are achieved by replacement of water in the sol, to the greatest extent possible, with an organic solvent, e.g. an alcohol; by moving the fiber core at an appropriate rate of speed to establish a meniscus at the surface thereof, permitting hydrogen to escape; providing other means to eliminate hydrogen bubbles from the electrophoretic deposition; closely controlling sol content and density so as to maintain the minimum concentration of water at the electrodes; and operating at appropriate voltages and rates of deposition and fiber core throughput to achieve this goal.

A sol suitable for use in preparation of the present invention may be prepared in the following manner, with particular attention being given to prevention of exposure of the reaction mixture to air. While the example is specific to the preparation of an alumina forming sol formulated from an aluminum sec-butoxide precursor, the present invention is not to be limited thereto.

EXAMPLE 1

For the preparation of an alumina sol, a 4000 ml glass reaction vessel was assembled with a variable temperature heating mantel, glass/teflon stirring rod with a laboratory mixer having variable speed control, an injection port with a teflon tube for insertion of liquids to the bottom of the reaction vessel, and a water-cooled pyrex condenser. After turning on the flow of cooling water to the condenser, 2500 grams (corresponding to 138.8 moles or 2500 ml) of deionized water was metered into the closed reaction vessel, after which the heating mantel was turned on to raise the temperature of the water to between 88° C. and 93° C., which temperature was thereafter maintained. The mixer motor was turned on when the water had reached this temperature, and the water was vigorously stirred. In a separately sealable glass transfer container, 357.5 grams (corresponding to 1.5 moles or 357.5 ml) of aluminum sec-butoxide $[Al(OC_4H_9)_3]$ was mixed with 288.86 grams (corresponding to 3.897 moles or 357.5 ml) of 2-butanol. Experience has taught that exposure of this mixture, or the aluminum sec-butoxide, to air for any longer than the absolute minimum necessary adversely affected the sol produced, so great care was exercised to avoid exposure. The mixture of sec-butoxide and butanol, in the transfer container, was connected to the reaction vessel entry port after the water had reached the desired temperature, and very slowly, over a 5 minute period, metered directly down into the hot deionized water. When all of the mixture had been introduced into the water, the entry port was valved shut and the transfer container removed. The mixture of water, sec-butoxide, and butanol was then permitted to hydrolyse for a period of 1 hour at temperature while stirring vigorously.

After 1 hour, and with the mixture still at temperature and being stirred vigorously, the sol mixture was peptized by connecting a glass syringe containing 8.18 grams (0.224 moles or 6.875 ml) of hydrochloric acid to the vessel entry port. The entry valve was opened and the acid metered directly down into the sol mixture. The valve was then closed, and the syringe removed and refilled with air. The syringe was then reconnected to the entry port, and the air injected into the vessel to ensure that all of the acid had been introduced into the system. The valve was then closed, and the syringe removed.

The heat and stirring were maintained until the sol cleared, about 16 hours. The heat was then turned off and the stirrer and motor assembly removed. After the mixture cooled, the sol and alcohol separated, and the alcohol was removed by pipette. It was found that leaving a small amount of alcohol in the sol did not adversely affect the sol. The pH of the sol was measured and found to be pH 3.90. This initial sol was found to have a good shelf life, and could be stored prior to further processing to obtain a sol suitable for electrophoresis.

A sol was then specifically formulated for the express purpose of making coated fibers in a continuous process. This specific formulation was also found to be suitable for coating fiber cores or other substrates with a composite coating material, wherein the composite included any chopped fiber material, platelets, powder, or particulates, of metals or other materials in the alumina matrix.

This sol was derived from the initial sol prepared above. A 390 ml sample of the sol prepared above was heated in an open glass beaker to a temperature of approximately 93° C., and the volatiles, alcohol and excess water, evaporated off. The sol was heated until it had been reduced to 250 ml, i.e. to 64 percent of its initial volume, with a noted increase in viscosity. The reduced sol was then removed from the heat and permitted to cool to room temperature. The reduced sol was then re-alcoholized with 750 ml of ethyl alcohol (63 moles of alcohol/mole of aluminum hydrate present). The sol and alcohol were vigorously mixed, then sealed in an air tight container for storage. The pH of this sol was about pH 3.8. This sol was set aside for 5 months, demonstrating good shelf life, and then subjected to electrophoretic deposition.

To electrophoretically deposit a ceramic oxide coating on a filament, fiber tow, or wire, hereinafter fiber core, apparatus such as shown generally in FIG. 1 may be used. Any fiber core may be coated with a ceramic in accord with this invention, if it is electrically conductive, or can be so treated as to be made electrically conductive. For example, fibers of aluminum, carbon, copper, silver, platinum, etc., are normally conductive, while fibers of cotton, polyester, etc., must be made conductive to be used in the present invention. Such fibers may, for example, be coated with a conductive metal or carbon, by conventional coating techniques such as flame spray, plasma spray, etc.

A fiber core may be electrophoretically coated by applying a controlled electrical potential within a colloidal solution of charged particles, with the colloids being driven towards the fiber, at a specific rate controlled by the sol chemistry and the applied electrical potential between the metallic electrodes. The metal anode may be copper, aluminum, silver, gold, platinum, or another electrically conductive metal, but platinum is the preferred material for the anode. The fiber core, being electrically conductive, is the cathodic surface for purposes of electrophoresis of a positively charged sol. If a basic peptizer is utilized in preparation of the sol, the electrodes would, of course, be reversed. The colloidal particles collect in a uniform manner about and along the fiber core, producing a dense, uniform, adherent coating, the chemistry and mechanical properties of which are determined by the sol chemistry, applied electrical potential, and post-coating heat treatment. As a continuous length of fiber core is drawn through the sol, the coating process is effectively continuously repeated. Depending on the coating structure desired, after the fiber core is coated it may be drawn through a furnace, laser, or other heat source, at an appropriate temperature. The process may be better understood from an examination of FIG. 1.

A sol, or colloidal solution, 10, is contained in a sol reservoir 12, having a membrane 14, at the lower end. A conductive fiber core 16, from supply spool 18, is first cleaned (at cleaner 20) by a heat source, such as a laser or furnace, a chemical bath, or other suitable cleaning means, prior to contacting either a pair of or a single roller or pulley 22, which is connected to a variable DC power source 24. The fiber core thence passes through the sealing membrane 14, through the sol 10, and through the annular anode 26. After having been electrophoretically coated during passage through the annular anode 26, the coated fiber core passes through a furnace or furnaces 28, for drying and phase transformation of the coating. The furnaces are illustrated as being electric, with AC power sources 20, but any form of heating source may be utilized. The ceramic coated fiber may now be collected on take-up spool 32.

Such apparatus is useful for the production of ceramic coated fibers, dependent upon control of variables such as rate of fiber core passage through the annular anode, applied potential at the anode, density of the sol, and extent of hydrogen bubble removal measures. These factors are determinative of the degree of success achieved in the preparation of defect-free, uniformly distributed, compact, and strongly adherent coatings on a fiber core. The removal of hydrogen from the coating is of particular importance, since its presence during the heating and drying steps results in creation of escape paths, and hence cracks.

To decrease hydrogen evolution during electrophoresis, one effective approach is to limit the amount of water present in the sol subjected to electrophoresis, since the disassociation of water to hydrogen and oxygen is the source of bubbles which cause defects in the metal oxide layer deposited. One means to accomplish this is to dewater, or concentrate the sol during preparation thereof, by evaporation of the water present to the greatest extent possible without causing the sol to gel, and then replacing such water in the sol by the addition of an alcohol, such as methanol, ethanol, isopropanol, butanol, etc. It has been found that in sols such as prepared as in Example 1, an alcohol to metal hydrate molar ratio of above 50 is desirable, and that such sols are subject to markedly decreased hydrogen evolution during electrophoresis. Broadly, a molar ratio of alcohol to metal hydrate of from about 50 to about 70 has been found effective, with a preferred range of from about 55 to about 69, and a more preferred range of from about 58 to about 67.

An alternative approach to hydrogen removal is to move the fiber core through the sol at such a rate that a meniscus forms between the coated fiber and the surface of the sol where the coated fiber exits the sol. This creates an easier escape path for hydrogen gas at the point of separation of sol and coated fiber. The increased rate of fiber core throughput is also beneficial in terms of production rate, but requires a corresponding increase in electrical potential to achieve the same coating thicknesses obtained at lower coating speeds, due to decreased deposition time. The increased voltage, on the other hand, increases the rate of hydrogen evolution. Accordingly, the rates of fiber core throughput and coating voltage should be adjusted in accordance with the coating thickness desired and the specific sol and fiber core employed. It has been found that potentials of from about 0.1 volt to about 100 volts or higher may be employed, preferably from 1 to 50 volts, and most preferably from about 35 to about 50 volts, with the fiber core subjected to a deposition period (i.e. the time of passage of a specified point on the fiber core through the length of the annular anode) dependent upon the specific conductivity of the fiber core, the specific composition of the sol, and the voltage applied. Thus, the coating rate may vary greatly. For example, a fiber core may be coated by a YAG at a much faster rate and a much lower voltage than the same fiber may be coated with an alumina sol.

Of course, variation in the length of the anode will also influence these factors, with a longer anode permitting faster fiber core movement and/or lower voltages to achieve similar results. These parameters may be adjusted as desired. It is noted that for purposes of obtaining defect-free, uniform and adherent coatings, it is preferable to operate at throughput rates below about 3000 feet per minute and voltages from about 1 to about 50 volts, in the presence of hydrogen dispersal and removal means, thereby decreasing the formation of cracks or voids in the coating resulting from the presence of hydrogen. To obtain the best quality coatings, electrophoresis at less than about 50 volts is recommended, although quite acceptable coatings may be obtained at potentials up to 100 volts, dependent upon the specific sol, the rate of fiber core passage through the sol, and the measures taken to eliminate hydrogen.

The removal of hydrogen from the surface of the fiber may also be aided by mechanical means, such as by vibration, including ultrasonic vibration of the sol, or by providing a flow of air or inert gas bubbles adjacent the fiber during its passage through the annular anode. This latter course of action greatly improves hydrogen removal and coating quality, and increases fiber throughput greatly.

An additional factor in achieving successful deposition is the density of the metal hydrate in the sol, i.e. the availability of material for deposition. This may be influenced by recirculation of the sol to maintain a nearly constant concentration A large sol holding tank, not illustrated, may be utilized, with a recirculating pump to cause the flow of sol through the sol reservoir 12, with fresh sol added as appropriate to maintain the desired concentration.

After passage through the sol reservoir, the newly coated fiber core, bearing a deposit of metal hydrate, must be dried. While air drying may be used, this approach is much too slow and limiting for a continuous process and would result in a hydrate coating as opposed to an oxide. Preferably, the coated fiber should be passed through a heated drying zone, such as a furnace or laser focus point to remove any water and/or alcohol entrapped by the deposited particulate matter during electrophoresis, and to achieve transformation of the hydrate to the oxide. Dependent upon the time and temperature of this heating or curing step, one may control the degree of phase transformation to obtain the desired phase of alumina, yttria, or alumina-yttria-garnet in the coating. The appropriate temperatures for curing of the coating are within the skill of the operator and may easily be determined, but temperatures from about 850° F. to about 1200° F. and above are appropriate for oxide formation from the metallic hydrate. Depending upon packing density, degree of phase transformation, thickness of ceramic coating, etc., this coated fiber may exhibit varying degrees of flexibility, but in most instances may be wound upon a collection spool of approximately 4 inch diameter or greater. Such flexibility is of great value in the use of such coated fibers.

Coatings have been applied to various fiber cores to produce ceramic coated fibers suitable for inclusion in metal matrix composites, wherein the oxide coatings serve as diffusion or chemical barriers.

EXAMPLE 2

An alumina sol produced as in Example 1 was used to electrophoretically deposit a 4–6 micron thick coating on a 2 mil diameter wire of Incoloy 909 iron base alloy. A strongly adherent coating was obtained by deposition in accordance with the method set forth above, at a potential of 50 volts direct current, a feed rate of 1200 feet per hour of wire, and a curing temperature of 1600° F. Further, using a sol prepared in accordance with Example 1, a 0.3 mil alumina coating was deposited a 1 mil diameter tungsten wire.

EXAMPLE 3

A sol comprising alumina doped with 3 weight percent chromium was prepared in accordance with Example 1. Using the deposition process of this invention, a 35 micron thick layer of chrome ion doped alumina was electrophoretically deposited on a 2 mil diameter wire of Incoloy 909 alloy.

EXAMPLE 4

A 2 mil tungsten wire, doped with 3 percent rhenium, was subjected to electrophoresis in 400 grams of alumina sol prepared as above, to which had been added 20 grams of molybdenum disilicide. At a potential of 100 volts and a feed rate of 120 feet per hour, an adherent coating of gamma alumina with particulate molybdenum disilicide therein from 15-18 microns thick was obtained. When the same electrophoresis was conducted at 50 volts and 600 feet per hour, a much thinner but equally adherent coating of alumina/molybdenum disilicide resulted, demonstrating the interdependence of voltage, feed rate, and deposition rate. Cure temperatures of 1100° F. were used in both cases.

EXAMPLE 5

A 5.4 mil silicon carbide fiber core was subjected to electrophoresis in an alumina sol prepared as above, at a potential of 30 volts, a feed rate of 450 feet per hour, and a cure temperature of 1100° F. A void-free coating of alumina 2-3 microns thick was obtained. A second sample of this fiber core was subjected to a potential of 50 volts at a feed rate of 300 feet per hour. An excellent 2 micron coating of alumina was obtained after a 1200° F. cure.

EXAMPLE 6

A 1 mil fiber core wire of tungsten/rhenium was subjected to electrophoresis in a YAG sol at 5 volts potential, at varying feed rates of up to 600 feet per hour, resulting in ceramic coatings of 1, 3, 5, and 7 microns thickness, dependent upon feed rate. This example also illustrates the very high deposition rates available with a YAG sol, which gave excellent defect-free coatings at 5 volts, and at high rates of passage.

EXAMPLE 7

A one mil tungsten/rhenium wire was subjected to electrophoresis in 400 grams of alumina sol to which had been added about 0.1 gram of 0.3 micron alpha-alumina powder, at 32 volts. The result of this seeding was a two-phase alumina coating of greater rigidity and strength that resulted in a similar coating absent the alpha-alumina powder.

EXAMPLE 8

Using similar sol preparation and deposition techniques, alumina, yttria, and YAG coatings were applied in various thicknesses to molybdenum, tungsten, niobium, silicon carbide, and carbon fiber cores to produce continuous coated fibers. Such coated fibers have great potential for use as reinforcement fibers in various matrix composites.

It is to be understood that the above disclosure of the present invention is subject to considerable modification, change, and adaptation by those skilled in the art, and that such modifications, changes, and adaptations are to be considered to be within the scope of the present invention, which is set forth by the appended claims.

We claim:

1. An essentially defect-free metal oxide coated fiber, said coated fiber produced by:
   a) providing a sol comprising metal hydrate particles selected from the group consisting of aluminum hydrate, yttrium hydrate, and mixtures thereof, said particles being less than 150 Angstroms in size, said sol also comprising an alcohol such that the molar ratio of said alcohol to said metal hydrate is from about 50 to about 70;
   b) electrophoretically depositing particles from said sol onto on electrically conductive fiber core by applying a direct current potential between said fiber core and an anode, said potential being from about 0.1 to about 100 volts, for sufficient time to obtain a uniform deposit of the desired thickness of metal hydrate on said fiber core, while providing means for removal of hydrogen gas generated by said electrophoresis;
   c) removing the metal hydrate coated fiber core from said sol;
   d) heating the metal hydrate coated fiber core to dry the coating and to transform said metal hydrate to the corresponding metal oxide; and
   e) recovering the metal oxide coated fiber.

2. A coated fiber as set forth in claim 1, wherein said means for removal of hydrogen gas includes means to sweep the surface of said fiber core with bubbles.

3. A coated fiber as set forth in claim 1, wherein said potential is from about 1 to about 50 volts.

4. A coated fiber as set forth in claim 3, wherein said potential is from about 35 to about 50 volts.

5. A coated fiber as set forth in claim 1, wherein said fiber core is selected from the group consisting of carbon, glass, silicon carbide, silicon nitride, and metals selected from aluminum, iron, nickel, tantalum, titanium, molybdenum, tungsten, rhenium, niobium, and alloys thereof.

6. A coated fiber as set forth in claim 5, wherein said ceramic is alumina, and said fiber core is an iron based alloy.

7. A coated fiber as set forth in claim 5, wherein the sol is recirculated to maintain the concentration thereof.

8. A coated fiber as set forth in claim 5, wherein said metal hydrate coated fiber core is heated to a temperature of at least 850° F.

9. A coated fiber as set forth in claim 8, wherein said metal hydrate is aluminum hydrate.

10. A coated fiber as set forth in claim 9, wherein said fiber core is selected from carbon, silicon carbide, iron, molybdenum, tungsten, niobium, rhenium, and alloys thereof.

11. A coated fiber as set forth in claim 8, wherein said metal hydrate is yttrium hydrate.

12. A coated fiber as set forth in claim 11, wherein said fiber core is selected from carbon, silicon carbide, iron, molybdenum, tungsten, niobium, rhenium, and alloys thereof.

13. A coated fiber as set forth in claim 8, wherein said metal hydrate is a chrome ion doped aluminum hydrate.

14. A coated fiber as set forth in claim 8, wherein said metal hydrate is a mixture of aluminum hydrate and yttrium hydrate.

15. A largely void-free metal oxide coated fiber produced by:

a) continuously passing an electrically conductive fiber core through an electrophoresis cell containing a sol prepared by the steps of
   (1) concurrent hydrolysis and alcoholization of an organometallic compound in an aqueous medium comprising water and an alcohol;
   (2) peptization of this reaction mixture with a monovalent acid or acid source;
   (3) dehydration and de-alcoholization of the reaction mixture by removal of the excess aqueous phase;
   (4) dewatering and further removal of unreacted alcohol by evaporation; and
   (5) re-alcoholization by introduction of additional alcohol to the concentrated sol to form a sol wherein the molar ratio of alcohol to metal hydrate is from about 50 to about 70, and the particle size of said metal hydrate is from about 10 to about 150 Angstroms;
b) applying a potential between said fiber core and another electrode immersed in said sol, whereby metal hydrate particles are continuously deposited on said fiber core;
c) decreasing the evolution of hydrogen by operating said electrophoresis cell at a potential of from about 1 to about 50 volts;
d) providing means for the dispersal and removal of hydrogen gas from the electrophoresis cell;
e) heating the fiber core and metal hydrate particles deposited thereupon after said fiber core emerges from said sol, so as to form a metal oxide coating on said fiber core.

16. A coated fiber as set forth in claim 15, wherein said fiber core is selected from the group consisting of carbon, glass, silicon carbide, silicon nitride, and metals selected from aluminum, iron, nickel, tantalum, titanium, molybdenum, tungsten, rhenium, niobium, and alloys thereof.

17. A coated fiber as set forth in claim 16, wherein said metal oxide is selected from the group consisting of alumina, chrome-ion doped alumina, yttria, and yttria-alumina-garnet.

18. A coated fiber as set forth in claim 17 wherein the thickness of said coating is equal to or less than the diameter of said fiber core.

19. A coated fiber as set forth in claim 18, wherein said alcohols are selected from methanol, ethanol, isopropanol, and butanol, and said organometallic compound is selected from the group consisting of the sec-butoxides, ethoxides, and methoxides of aluminum, yttrium, and mixtures thereof.

20. A coated fiber as set forth in claim 18, wherein said means for dispersal and removal of hydrogen gas comprises a source of bubbles of inert gas adjacent the fiber core during its passage through the cell.

* * * * *

UNITED STATES PATENT AND TRADEMARK OFFICE
CERTIFICATE OF CORRECTION

PATENT NO.  : 5,306,560

DATED       : April 26, 1994

INVENTOR(S) : Robert J. Wright et al

It is certified that error appears in the above-identified patent and that said Letters Patent is hereby corrected as shown below:

In column 5, at lines 9-11, change "co-pending U.S. patent application 07/ filed concurrently herewith and" to --U.S. Patent No. 5,302,319--.

In column 11, at line 1 after "deposited" and before "a", insert --upon--.

In column 12, at line 14, change "on" to --an--.

Signed and Sealed this

Twenty-fifth Day of October, 1994

Attest:

BRUCE LEHMAN

*Attesting Officer*    Commissioner of Patents and Trademarks